US009826369B2

(12) United States Patent
Trainin et al.

(10) Patent No.: US 9,826,369 B2
(45) Date of Patent: *Nov. 21, 2017

(54) DEVICE, SYSTEM AND METHOD OF COMMUNICATING UPPER-LAYER PROTOCOL INFORMATION

(71) Applicant: INTEL CORPORATION, Santa Clara, CA (US)

(72) Inventors: Solomon B. Trainin, Haifa (IL); Carlos Cordeiro, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 103 days.

This patent is subject to a terminal disclaimer.

(21) Appl. No.: 14/824,281

(22) Filed: Aug. 12, 2015

(65) Prior Publication Data

US 2015/0350386 A1 Dec. 3, 2015

Related U.S. Application Data

(63) Continuation of application No. 13/820,547, filed as application No. PCT/US2011/050532 on Sep. 6, 2011, now Pat. No. 9,137,090.

(Continued)

(51) Int. Cl.
*H04L 1/00* (2006.01)
*H04W 4/08* (2009.01)
(Continued)

(52) U.S. Cl.
CPC ............ *H04W 4/08* (2013.01); *H04L 29/0653* (2013.01); *H04L 61/6022* (2013.01);
(Continued)

(58) Field of Classification Search
CPC .. C04B 40/0039; H04W 16/14; H04W 48/16; H04W 76/023
(Continued)

(56) References Cited

U.S. PATENT DOCUMENTS 6,570,884 B1 * 5/2003 Connery ............... H04L 45/745
370/392
2003/0133494 A1 7/2003 Bender et al.
(Continued)

FOREIGN PATENT DOCUMENTS

EP 1309139 5/2003
EP 1594284 11/2005
WO 2007115469 10/2007

OTHER PUBLICATIONS

Search Report for European Patent Application No. 11824012.6 mailed on Jun. 17, 2016, 10 pages.
(Continued)

*Primary Examiner* — Dady Chery
(74) *Attorney, Agent, or Firm* — Shichrur & Co.

(57) ABSTRACT

Some demonstrative embodiments include devices, systems and/or methods of communicating upper-layer protocol information. For example, a wireless communication unit to transmit a management frame, e.g., a Traffic Stream Establishment (TSE) frame, including an Upper-Layer-Identification (UPID) element including a control field indicating a protocol of a layer higher than a Media-Access-Control (MAC) layer.

28 Claims, 3 Drawing Sheets

Related U.S. Application Data

(60) Provisional application No. 61/380,379, filed on Sep. 7, 2010.

(51) Int. Cl.

| | | |
|---|---|---|
| *H04W 72/00* | (2009.01) | |
| *H04L 29/12* | (2006.01) | |
| *H04W 12/04* | (2009.01) | |
| *H04L 29/06* | (2006.01) | |
| *H04W 72/04* | (2009.01) | |
| *H04W 8/26* | (2009.01) | |
| *H04W 76/02* | (2009.01) | |
| *H04W 84/20* | (2009.01) | |

(52) U.S. Cl.
CPC ............... *H04L 69/22* (2013.01); *H04W 8/26* (2013.01); *H04W 12/04* (2013.01); *H04W 72/005* (2013.01); *H04W 72/0446* (2013.01); *H04W 76/025* (2013.01); *H04W 84/20* (2013.01)

(58) Field of Classification Search
USPC .................. 370/474, 472, 475, 476, 465
See application file for complete search history.

(56) References Cited

U.S. PATENT DOCUMENTS

| | | | |
|---|---|---|---|
| 2005/0243786 | A1 | 11/2005 | Bae et al. |
| 2006/0215601 | A1 | 9/2006 | Vleugels et al. |
| 2007/0008967 | A1 | 1/2007 | Bressler et al. |
| 2008/0219228 | A1 | 9/2008 | Seok et al. |
| 2009/0274173 | A1 | 11/2009 | Wentink |
| 2011/0188429 | A1* | 8/2011 | Seok .................. H04W 76/023 370/311 |
| 2013/0195121 | A1 | 8/2013 | Ttainin et al. |

OTHER PUBLICATIONS

Jean Lorchat et al, Energy Saving in IEEE 802.11 Communications using Frame Aggregation, Globecom, Dec. 1, 2003, pp. 1296-1300.

Tianji Li et al, "A New MAC Scheme for Very High-Speed WLANs", Proceedings of the 2006, International Symposium on a World of Wireless, Mobile and Multimedia, Jun. 26, 2006, 10 pages.

Carlos Cordeiro, CID 487 Clarifying misc paras (part 2) IEEE 802.11-10/1104r0, Sep. 13, 2010, pp. 1-5.

Wireless Gigabit Alliance (WGA) Specifications; WiGig MAC and PHY Specification Version 1.0, Apr. 2010-Final Specification; 311 pages.

ANSI/IEEE Std 802.2, 1998 Edition, IEEE Standard for Information technology—Telecommunications and information exchange between systems—Local and metropolitan area networks—Specific requirements Part 2: Logical Link Control, Apr. 15, 1998, 253 pages.

IEEE Std 802.11™-2007 (Revision of IEEE Std 802.11-1999) IEEE Standard for Information technology—Telecommunications and information exchange between systems—Local and metropolitan area networks—Specific requirements. Part 11: Wireless LAN Medium Access Control (MAC) and Physical Layer (PHY) Specifications, Jun. 12, 2007,1232 pages.

International Search Report and Written Opinion for International Patent Application No. PCT/US2011/050532, mailed on Apr. 9, 2012, 9 pages.

Office Action for U.S. Appl. No. 13/820,547, mailed on Jan. 2, 2015, 12 pages.

International Preliminary Report on Patentability for International Patent Application No. PCT/US2011/050532, mailed on Mar. 21, 2013, 6 pages.

Office Action for European Patent Application No .11824012.6, dated Aug. 17, 2017, 8 pages.

* cited by examiner

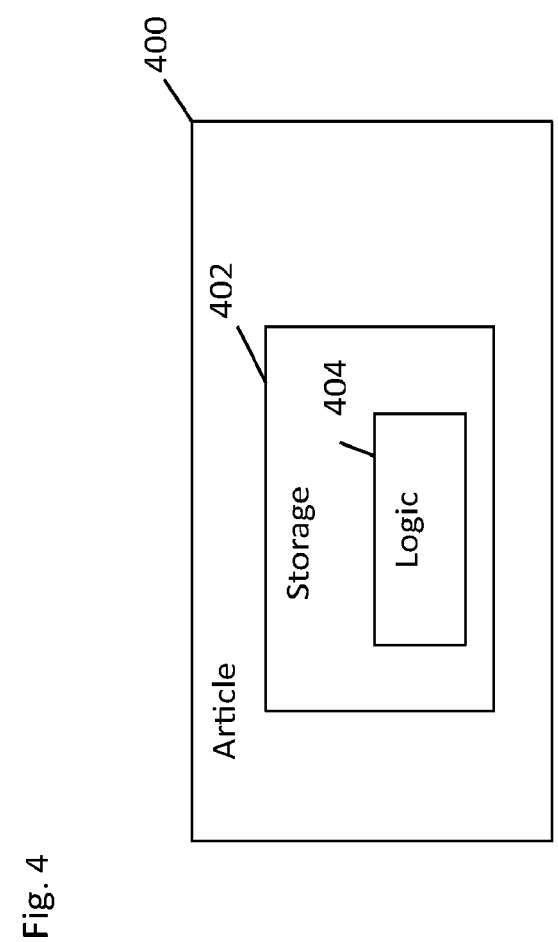

DEVICE, SYSTEM AND METHOD OF COMMUNICATING UPPER-LAYER PROTOCOL INFORMATION

CROSS REFERENCE

This application claims the benefit of and priority from US Provisional Patent application No. 61/380,379, entitled "Method System and Apparatus for Communication At Wireless Link", filed Sep. 7, 2010, the entire disclosure of which is incorporated herein by reference.

BACKGROUND

A first wireless communication device may transmit one or more data packets to a second wireless communication device.

Each data packet typically includes a header, e.g., a Logical Link Control (LLC) header, which includes information defining an upper-layer protocol to be used for processing the packet. The length of the LLC header is, for example, eight bytes.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

FIG. 4 is a schematic illustration of an article of manufacture, in accordance with some demonstrative embodiments.

DETAILED DESCRIPTION

Figure 1:
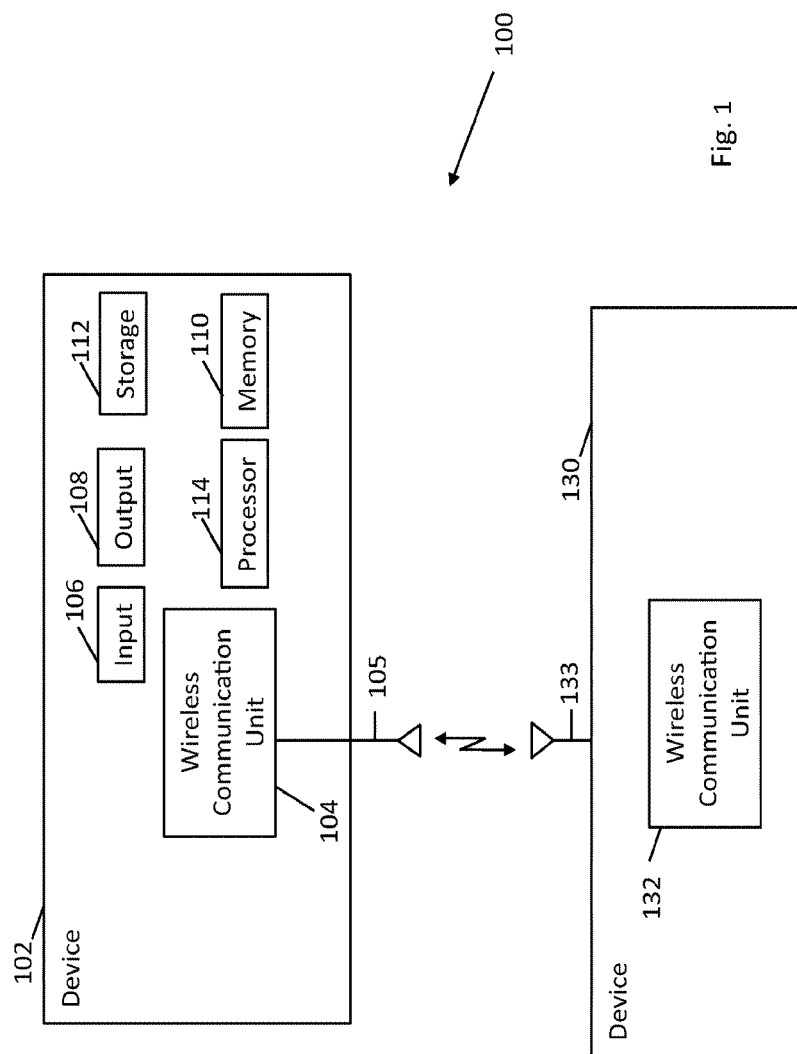
FIG. 1 is a schematic block diagram illustration of a system in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality" as used herein include, for example, "multiple" or "two or more". For example, "a plurality of items" includes two or more items.

Some embodiments may be used in conjunction with various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), devices and/or networks operating in accordance with existing Wireless-Gigabit-Alliance (WGA) specifications (*Wireless Gigabit Alliance, Inc WiGig MAC and PHY Specification Version 1.0, April* 2010, *Final specification*) and/or future versions and/or derivatives thereof, devices and/or networks operating in accordance with existing IEEE 802.11 standards (*IEEE 802.11-2007, IEEE Standard for Information Technology—Telecommunications and information exchange between systems—Local and metropolitan area networks—Specific requirements, Part* 11: *Wireless LAN Medium Access Control (MAC) and Physical Layer (PHY) Specifications; IEEE* 802.11n-2009, *IEEE Standard for Information Technology—Telecommunications and information exchange between systems—Local and metropolitan area networks—Specific requirements, Part* 11: *Wireless LAN Medium Access Control (MAC) and Physical Layer (PHY) specifications, Amendment* 5: *Enhancements for Higher Throughput*; IEEE802.11 task group ac (TGac) ("*IEEE*802.11-09/0308r12 —*TGac Channel Model Addendum Document*"), IEEE 802.11 task group ad (*TGad*)) (*IEEE P*802.11ad/D1.0 *Draft Standard for Information Technology—Telecommunications and Information Exchange Between Systems—Local and Metropolitan Area Networks—Specific Requirements—Part* 11: *Wireless LAN Medium Access Control (MAC) and Physical Layer (PHY) Specifications—Amendment* 5: *Enhancements for Very High Throughput in the* 60 *GHz Band*), and/or future versions and/or derivatives thereof, devices and/or networks operating in accordance with existing IEEE 802.16 standards (*IEEE-Std* 802.16, 2009 *Edition, Air Interface for Fixed Broadband Wireless Access Systems; IEEE-Std* 802.16e, 2005 *Edition, Physical and Medium Access Control Layers for Combined Fixed and Mobile Operation in Licensed Bands; amendment to IEEE Std* 802.16-2009, *developed by Task Group m*) and/or future versions and/or derivatives thereof, devices and/or networks operating in accordance with existing Wireless-WirelessHD™ specifications and/or future versions and/or derivatives thereof, units and/or devices which are part of the above networks, one way and/or two-way radio communication systems, cellular radio-telephone communication systems, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device (e.g., BlackBerry, Palm Treo), a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, Enhanced Data rates for GSM Evolution (EDGE), or the like. Other embodiments may be used in various other devices, systems and/or networks.

The term "wireless device" as used herein includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

Some demonstrative embodiments may be used in conjunction with suitable limited-range or short-range wireless communication networks, for example, a wireless area network, a "piconet", a WPAN, a WVAN and the like. Other embodiments may be used in conjunction with any other suitable wireless communication network.

Some demonstrative embodiments may be used in conjunction with a wireless communication network communicating over a frequency band of 60 GHz. However, other embodiments may be implemented utilizing any other suitable wireless communication frequency bands, for example, an Extremely High Frequency (EHF) band (the millimeter wave (mmwave) frequency band), e.g., a frequency band within the frequency band of between 30 Ghz and 300 GHZ, a WLAN frequency band, a WPAN frequency band, a frequency band according to the WGA specification, and the like.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include an antenna covered by a quasi-omni antenna pattern. For example, the antenna may include at least one of a phased array antenna, a single element antenna, a set of switched beam antennas, and the like.

The phrase "quasi-omni antenna pattern", as used herein, may include an operating mode with a widest practical beamwidth attainable for a particular antenna.

The term "station" (STA), as used herein, may include any logical entity that is a singly addressable instance of a medium access control (MAC) and a physical layer (PHY) interface to a wireless medium (WM).

The phrase "access point" (AP), as used herein, may include an entity that contains one station (STA) and provides access to distribution services, via the WM for associated STAs.

The term "association", as used herein may relate to a service used to establish access point/station (AP/STA) mapping and enable STA invocation of distribution system services (DSSs).

The term "authentication", as used herein may relate to a service used to establish the identity of one station (STA) as a member of the set of STAs authorized to associate with another STA.

The term "beamforming", as used herein, may relate to a spatial filtering mechanism, which may be used at a transmitter to improve the received signal power or signal-to-noise ratio (SNR) at an intended receiver.

The phrase "non-access-point (non-AP) station (STA)", as used herein, may relate to a STA that is not contained within an AP.

The phrase "service period" (SP), as used herein, may relate to a contiguous time during which one or more downlink individually addressed frames are transmitted to a quality of service (QoS) station (STA) and/or one or more transmission opportunities (TXOPs) are granted to the same STA.

The phrase "directional band" (DBand), as used herein, may relate to a frequency band wherein the Channel starting frequency is above 45 GHz.

The phrase "Ultra Band (UB)" may relate to the frequency band of 57-66 GHz.

The phrase "mmWave STA (STA)" may relate to a STA having a radio transmitter, which is operating on a channel that is within the UB.

The phrase "personal basic service set" (PBSS), as used herein, may relate to a basic service set (BSS) that forms a self-contained network. For example, the PBSS may operate in the DBand, and may include one PBSS control point (PCP).

The phrase "PBSS control point" (PCP), as used herein, may include an entity that contains one station (STA) and coordinates access to the WM by STAs that are members of a PBSS.

The phrase "non-PCP station (STA)", as used herein, may relate to a STA that is not also a PCP.

The phrase "non-PCP/non-AP station (STA)", as used herein, may relate to a STA that is not a PCP and that is not an AP.

The phrase "PCP/AP", as used herein, may relate to a STA that is a PCP or an AP.

Reference is now made to FIG. 1, which schematically illustrates a block diagram of a system 100 in accordance with some demonstrative embodiments.

As shown in FIG. 1, in some demonstrative embodiments, system 100 may include a wireless communication network including one or more wireless communication devices, e.g., wireless communication devices 102 and/or 130, capable of communicating content, data, information and/or signals over one or more suitable wireless communication links, for example, a radio channel, an IR channel, a RF channel, a Wireless Fidelity (WiFi) channel, and the like. One or more elements of system 100 may optionally be capable of communicating over any suitable wired communication links.

In some demonstrative embodiments, wireless communication devices 102 and/or 130 may include, for example, may include, for example, a PC, a desktop computer, a mobile computer, a laptop computer, a notebook computer, a tablet computer, a server computer, a handheld computer, a handheld device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a gaming device, a data source, a data sink, a Digital Still camera (DSC), a media player, a Smartphone, a television, a music player, or the like.

In some demonstrative embodiments, wireless communication devices 102 and/or 130 may include wireless communication units 104 and/or 132, respectively, to perform wireless communication with wireless communication devices 102 and/or 130, respectively, and/or with one or more other wireless communication devices, e.g., as described below.

Wireless communication devices 102 and/or 130 may also include, for example, one or more of a processor 114, an input unit 106, an output unit 108, a memory unit 110, and a storage unit 112. Wireless communication devices 102 and/or 130 may optionally include other suitable hardware components and/or software components. In some demonstrative embodiments, some or all of the components of one or more of wireless communication devices 102 and/or 130 may be enclosed in a common housing or packaging, and may be interconnected or operably associated using one or more wired or wireless links. In other embodiments, components of one or more of wireless communication devices 102 and/or 130 may be distributed among multiple or separate devices.

Processor 114 includes, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 114 executes instructions, for example, of an Operating System (OS) of wireless communication devices 102 and/or 130 and/or of one or more suitable applications.

Input unit 106 includes, for example, a keyboard, a keypad, a mouse, a touch-pad, a track-ball, a stylus, a microphone, or other suitable pointing device or input device. Output unit 108 includes, for example, a monitor, a screen, a flat panel display, a Cathode Ray Tube (CRT) display unit, a Liquid Crystal Display (LCD) display unit, a plasma display unit, one or more audio speakers or earphones, or other suitable output devices.

Memory unit 110 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 112 includes, for example, a hard disk drive, a floppy disk drive, a Compact Disk (CD) drive, a CD-ROM drive, a DVD drive, or other suitable removable or non-removable storage units. Memory unit 110 and/or storage unit 112, for example, may store data processed by wireless communication devices 102 and/or 130.

In some demonstrative embodiments, wireless communication units 104 and 132 may include, or may be associated with, one or more antennas 105 and 133, respectively. Antennas 105 and/or 133 may include any type of antennas suitable for transmitting and/or receiving wireless communication signals, blocks, frames, transmission streams, packets, messages and/or data. For example, antennas 105 and/or 133 may include any suitable configuration, structure and/or arrangement of one or more antenna elements, components, units, assemblies and/or arrays. Antennas 105 and/or 133 may include an antenna covered by a quasi-omni antenna pattern. For example, antennas 105 and/or 133 may include at least one of a phased array antenna, a single element antenna, a set of switched beam antennas, and the like. In some embodiments, antennas 105 and/or 133 may implement transmit and receive functionalities using separate transmit and receive antenna elements. In some embodiments, antennas 105 and/or 133 may implement transmit and receive functionalities using common and/or integrated transmit/receive elements.

In some demonstrative embodiments, wireless communication units 104 and/or 132 include, for example, one or more wireless transmitters, receivers and/or transceivers able to send and/or receive wireless communication signals, RF signals, frames, blocks, transmission streams, packets, messages, data items, and/or data. For example, wireless communication units 104 and/or 132 may include or may be implemented as part of a wireless Network Interface Card (NIC), and the like.

In some demonstrative embodiments, wireless communication devices 102 and 130 may establish a wireless communication link. The link may include an uplink and/or a downlink. The downlink may include, for example, a unidirectional link from an AP to one or more non-AP stations (STAs) or a unidirectional link from a non-AP Destination STA to a non-AP Source STA. The uplink may include, for example, a unidirectional link from a non-AP STA to an AP or a unidirectional link from a non-AP Source STA to a non-AP Destination STA.

In some demonstrative embodiments, wireless communication devices 102 and/or 130 may perform the functionality of mmWave stations ("mSTA").

In some demonstrative embodiments, wireless communication unit 104 may transmit one or more packets to wireless communication unit 132.

In some demonstrative embodiments, wireless communication unit 104 may transmit a relatively short packet. For example, the packet may have a size of less than 100 bytes, e.g., a size of 64 bytes. According to these embodiments, a length of a header, e.g., a Logical Link Control (LLC) header, which includes information defining an upper-layer protocol to be used for processing the packet, may not be negligible with respect to the length of the packet. For example, the LLC header may have a length of 8 bytes, which may be 12.5% the length of a 64-byte packet. Accordingly, it may be inefficient to include the LLC header as part of the packet In some demonstrative embodiments, wireless communication unit 104 may be configured to establish a traffic stream to be used for transmitting packets to wireless communication unit 132 and, during establishment of the traffic stream to indicate to wireless communication device 132 a protocol of a communication layer higher than a Media-Access-Control (MAC) layer to be used for processing the packets, e.g., as described in detail below. According to these embodiments, wireless communication unit 104 may transmit the packets according to the protocol, for example, while not including the LLC header in each of the packets.

In some demonstrative embodiments, wireless communication unit 104 may transmit a management frame, e.g., a Traffic Stream Establishment (TSE) frame, to establish a traffic stream with wireless communication unit 132. The TSE frame may include an Upper-Layer-Identification-Element (UPID) including a control field indicating a protocol ("upper layer protocol") of a layer higher than a Media-Access-Control (MAC) layer, which may be used for processing one or more data frames and/or packets associated with the traffic stream, e.g., as described in detail below.

In some demonstrative embodiments, the TSE frame may include an Add-Traffic-Specification (ADDTS) frame. For example, the ADDTS frame may include an ADDTS request frame or an ADDTS response frame.

In some demonstrative embodiments, after establishing the traffic stream, wireless communication unit 104 may transmit one or more data packets, for example, MAC service data units (MSDUs), configured according to the protocol indicated by the control field.

In some demonstrative embodiments, the control field may include a LLC header field.

In some demonstrative embodiments, the LLC header field may include, for example, a LLC header with eight-bit control field with Sub-Network-Access-Protocol (SNAP), a LLC header with eight-bit control field without SNAP, or a LLC header with sixteen-bit control field, e.g., as described below.

In some demonstrative embodiments, the TSE frame may include a bit indicating whether or not one or more MSDUs are to include the control field, e.g., as described below.

In some demonstrative embodiments, wireless communication unit 132 may determine the upper layer protocol during the establishment of the traffic stream, e.g., based on the UPID of the TSE frame. Wireless communication unit 132 may utilize the upper layer protocol indicated by the UPID for processing one or more packets received from wireless communication unit 104 via the established traffic stream.

Figure 2:
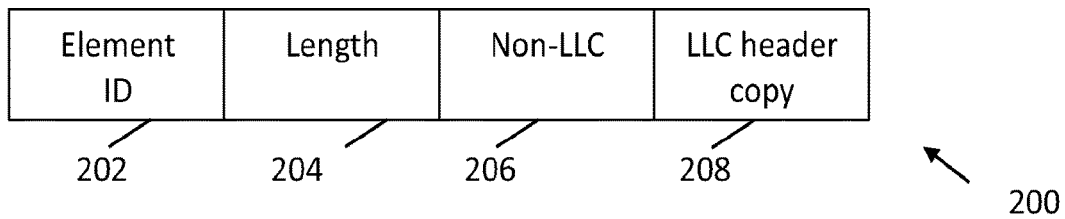
FIG. 2 is a schematic illustration of an upper-layer protocol identification element, in accordance with some demonstrative embodiments.

Reference is made to FIG. 2, which schematically illustrates a UPID 200, in accordance with some demonstrative embodiments. For example, UPID 200 may be included as part of an ADDTS Request frame, an ADDTS Response frame, and the like, which may be exchanged, e.g., between devices 102 and 130 (FIG. 1), during establishment of a traffic stream.

In some demonstrative embodiments, UPID 200 may include an element ID field 202, which may have a predefined value indicating that UPID 200 is to be used for upper layer protocol identification. For example, field 202 may have a length of one octet.

In some demonstrative embodiments, UPID 200 may include a length field 204 having a value indicating a length of UPID 200 or the length of one or more fields of UPID 200, e.g., subsequent to length field 204. For example, length field 204 may have a length of 1 octet.

In some demonstrative embodiments, UPID 200 may include a No-LLC field 206 having a value indicating whether or not one or more subsequently transmitted MSDUs will include a LLC header. For example, field 206 may be set to a first predefined value, e.g., "1", to indicate that the one or more MSDUs do not include the LLC header. Field 206 may be set to a second predefined value, e.g., "0", to indicate that the one or more MSDUs do include the LLC header. Field 206 may have for example, a length of one octet.

In some demonstrative embodiments, UPID 200 may include a LLC header copy field 208 having a including information indicating an upper layer protocol to be applied to the one or more subsequent MSDUs. For example, field 208 may include a LLC header. Field 208 may be set to "0" if, for example, No-LLC field 206 is set to "0". Field 208 may include, for example, a copy of LLC header field values if, for example, the No-LLC field 206 is set to "1".

In some demonstrative embodiments, a size LLC header copy field 208 may be related to a type of LLC header included in field 208, e.g., as follows:

TABLE 1

| LLC header type | LLC header copy field size (octets) |
| --- | --- |
| LLC header with 8-bit control field without Sub-Network-Access-Protocol (SNAP) | 3 |
| LLC header with 8 bit field with SNAP | 8 |
| LLC header with 16 bit control field | 4 |

For example, field 208 may include the LLC header, e.g., as defined by *IEEE Std* 802.2, 1998 *Edition(R2003)—IEEE Standard for Information technology Telecommunications and information exchange between systems Local and metropolitan area networks, Specific requirements*, and the like.

In other embodiments, field 208 may include any other suitable information, e.g., in addition to or instead of the LLC header and/or any other LLC header type, identifying and/or defining the upper layer protocol.

Referring back to FIG. 1, in some demonstrative embodiments, wireless communication unit 104 may transmit an ADDTS Request frame including a Traffic Specification (TSPEC) element specifying a Traffic ID (TID) or a Traffic Stream ID (TSID), and a U-PID element, e.g., UPID element 200 (FIG. 2), to indicate the upper layer protocol associated with the TID or TSID. In other embodiments, the ADDTS request frame may not include the UPID element.

In some demonstrative embodiments, wireless communication unit 104 may transmit an ADDTS Response frame including a TSPEC element specifying a TID or a TSID, and a U-PID element, e.g., UPID element 200 (FIG. 2), to indicate the upper layer protocol associated with the TID or TSID. The ADDTS response frame may not include the UPID element, for example, if the ADDTS request frame does not include a UPID element.

In some demonstrative embodiments, wireless communication unit 104 may include U-PID element 200 (FIG. 2) in ADDTS Request and/or ADDTS Response frames transmitted to indicate the protocol responsible for handling MSDUs corresponding to the TID/TSID indicated within the frame carrying the U-PID element.

Wireless communication unit 104 may not include UPID element 200 (FIG. 2) as part of an ADDTS Request frame, for example, if wireless communication unit 104 is to transmit MSDUs corresponding to the TID/TSID including an LLC protocol header to be used for upper layer protocol selection.

Wireless communication unit 104 may not include UPID element 200 (FIG. 2) as part of an ADDTS response frame, for example, if a U-PID element was not included in a corresponding ADDTS Request frame received by wireless communication unit 104.

In some demonstrative embodiments, if wireless communication unit 104 receives an U-PID element included in an ADDTS Request frame, then wireless communication unit 104 may transmit a ADDTS response frame with a Status Code of success and having a LLC header copy field, e.g., field 208 (FIG. 2), including the same LLC header copy field included in the UPID element of the ADDTS Request frame.

In some demonstrative embodiments, wireless communication unit 104 may reject the ADDTS request frame, e.g., to reject a setting of the U-PID element received within the ADDTS Request frame. For example, wireless communication unit 104 may set a Status Code field of the ADDTS response frame to REJECT_U-PID_SETTING.

Figure 3:
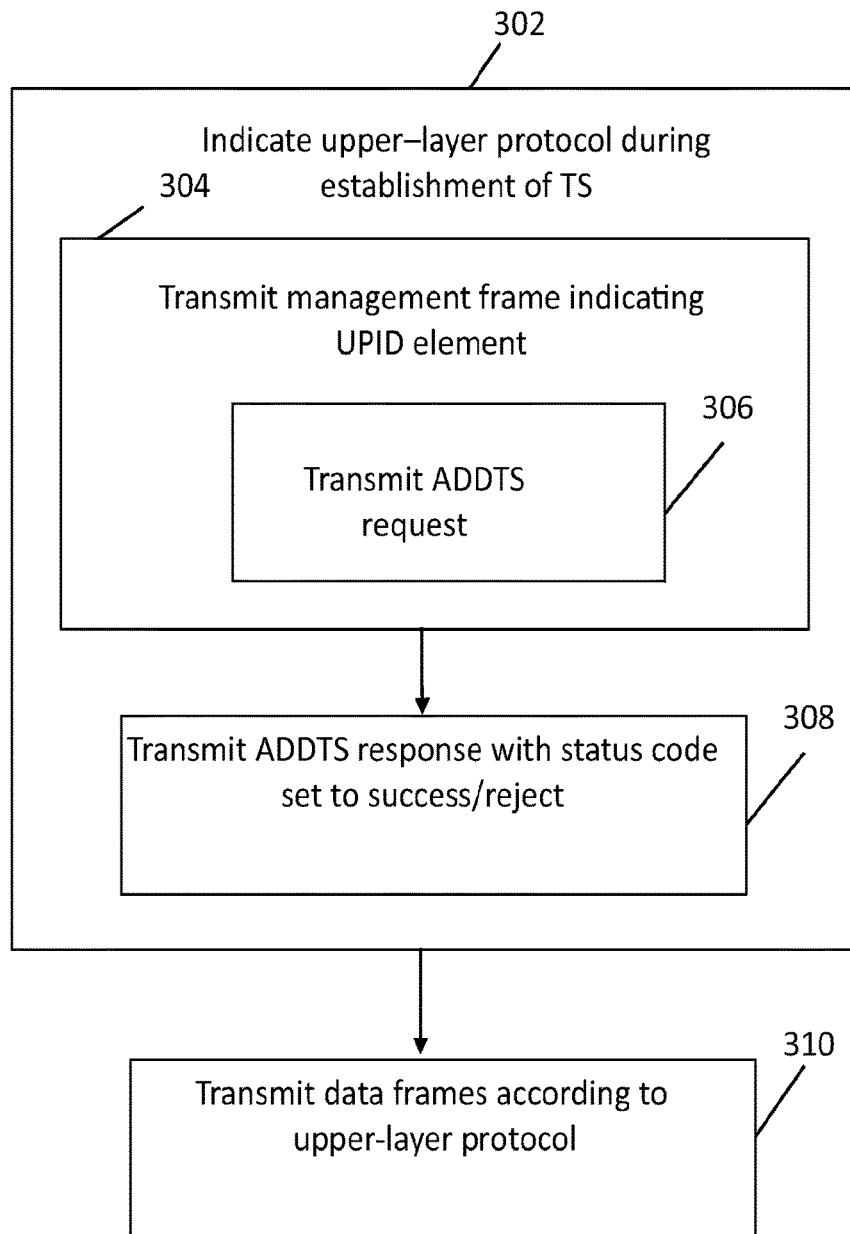
FIG. 3 is a schematic illustration of a method of wireless communication, in accordance with some demonstrative embodiments.

Reference is made to FIG. 3, which schematically illustrates a method of wireless communication, in accordance with some demonstrative embodiments. In some embodiments, one or more of the operations of the method of FIG. 3 may be performed by any suitable wireless communication system e.g., system 100 (FIG. 1); wireless communication device, e.g., devices 102 and/or 130 (FIG. 1); and/or wireless communication unit, e.g., wireless communication units 104 and/or 132 (FIG. 1).

As indicated at block 302, the method may include indicating a protocol ("upper layer protocol") of a communication layer higher than a MAC layer during establishment of a traffic stream.

As indicated at block 304, indicating the upper layer protocol may include transmitting a management frame, e.g., a TSE frame, including a UPID element indicating the upper layer protocol. For example, wireless communication unit 104 (FIG. 1) may transmit a TSE frame including UPID element 200 (FIG. 2), e.g., as described above.

As indicated at block 306, transmitting the TSE frame may include transmitting an ADDTS frame including the UPID element. For example, wireless communication unit 104 (FIG. 1) may transmit an ADDTS request frame or an ADDTS response frame including UPID element 200 (FIG. 2), e.g., as described above.

As indicated at block 308, the method may include receiving a response indicating whether the UPID is confirmed or rejected. For example, wireless communication unit 104 (FIG. 1) may transmit the ADDTS request frame including the UPID element and receive a response, e.g., an ADDTS response frame, indicating whether the UPID is confirmed or rejected, e.g., as described above.

As indicated at block 310, the method may include transmitting one or more data frames according to the upper layer protocol. For example, wireless communication device 104 (FIG. 1) may transmit one or more MSDUs multiplexed according to the upper layer protocol indicated by the UPID element and/or wireless communication unit 132 (FIG. 1) may demultiplex the one or more MSDUs according to the upper layer protocol indicated by the UPID element.

Reference is made to FIG. 4, which schematically illustrates an article of manufacture 400, in accordance with some demonstrative embodiments. Article 400 may include a machine-readable storage medium 402 to store logic 404, which may be used, for example, to perform at least part of the functionality of wireless communication unit 104 (FIG. 1), wireless communication device 102 (FIG. 1), wireless communication unit 132 (FIG. 1), wireless communication device 130 (FIG. 1); and/or to perform one or more operations of the method of FIG. 3.

In some demonstrative embodiments, article 400 and/or machine-readable storage medium 402 may include one or more types of computer-readable storage media capable of storing data, including volatile memory, non-volatile memory, removable or non-removable memory, erasable or non-erasable memory, writeable or re-writeable memory, and the like. For example, machine-readable storage medium 402 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 404 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 404 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

Functions, operations, components and/or features described herein with reference to one or more embodiments, may be combined with, or may be utilized in combination with, one or more other functions, operations, components and/or features described herein with reference to one or more other embodiments, or vice versa.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. A wireless communication unit comprising a memory and a processor, the processor configured to cause the wireless communication unit to:
generate an Add-Traffic-Specification (ADDTS) frame comprising a traffic specification element and an Upper-Layer-Identification (UPID) element, the traffic specification element configured to indicate a Traffic Identifier (TID), the UPID element configured to indicate a protocol to handle Media-Access-Control (MAC) service data units (MSDUs) corresponding to the TID, the UPID element comprising a Logical-Link-Control (LLC) header field, and a no-LLC field, the LLC header field comprising values of a LLC header, and the no-LLC field configured to indicate that said MSDUs are not to include the LLC header; and
cause transmission of the ADDTS frame over a directional frequency band comprising a channel with a channel starting frequency above 45 Gigahertz(GHz).

2. The wireless communication unit of claim 1, wherein said LLC header field comprises values of a LLC header with eight-bit control field without Sub-Network-Access-Protocol (SNAP), the LLC header field having a size of three octets.

3. The wireless communication unit of claim 1, wherein said LLC header field comprises values of a LLC header with eight-bit control field with Sub-Network-Access-Protocol (SNAP), the LLC header field having a size of eight octets.

4. The wireless communication unit of claim 1, wherein said LLC header field comprises values of a LLC header with sixteen-bit control field, the LLC header field having a size of four octets.

5. The wireless communication unit of claim 1, wherein said no-LLC field comprises a value of "1".

6. The wireless communication unit of claim 1, wherein said ADDTS frame comprises an ADDTS request frame.

7. The wireless communication unit of claim 6, wherein the processor is configured to process a received ADDTS response frame in response to the ADDTS request frame, the ADDTS response frame comprising a status code to indicate success or rejection of a setting of the UPID element.

8. The wireless communication unit of claim 1, wherein said ADDTS frame comprises an ADDTS response frame.

9. The wireless communication unit of claim 8, wherein said ADDTS response frame is in response to an ADDTS request frame comprising said UPID element.

10. The wireless communication unit of claim 9, wherein the LLC header field is the same as a LLC header field in the UPID element of the ADDTS request frame.

11. The wireless communication unit of claim 10, wherein the ADDTS response frame comprises a status code of success.

12. The wireless communication unit of claim 1, wherein the processor is configured to cause transmission of the MSDUs without the LLC header.

13. A wireless communication device comprising:
one or more antennas;
a wireless communication unit comprising a memory and a processor configured to generate an Add-Traffic-Specification (ADDTS) frame comprising a traffic specification element and an Upper-Layer-Identification (UPID) element, the traffic specification element configured to indicate a Traffic Identifier (TID), the UPID element configured to indicate a protocol to handle Media-Access-Control (MAC) service data units (MSDUs) corresponding to the TID, the UPID element comprising a Logical-Link-Control (LLC) header field, and a no-LLC field, the LLC header field comprising values of a LLC header, and the no-LLC field configured to indicate that said MSDUs are not to include the LLC header, the wireless communication unit configured to cause transmission of the ADDTS frame over a directional frequency band comprising a channel with a channel starting frequency above 45 Gigahertz (GHz).

14. The wireless communication device of claim 13, wherein said ADDTS frame comprises an ADDTS request frame.

15. The wireless communication device of claim 14, wherein the wireless communication unit is configured to process a received ADDTS response frame in response to the ADDTS request frame, the ADDTS response frame comprising a status code to indicate success or rejection of a setting of the UPID element.

16. The wireless communication device of claim 13, wherein said ADDTS frame comprises an ADDTS response frame.

17. The wireless communication device of claim 16, wherein said ADDTS response frame is in response to an ADDTS request frame comprising said UPID element.

18. A product comprising one or more tangible computer-readable non-transitory storage media comprising computer-executable instructions operable to, when executed by at least one processor, enable the at least one processor to cause a wireless station to:
generate an Add-Traffic-Specification (ADDTS) frame comprising a traffic specification element and an Upper-Layer-Identification (UPID) element, the traffic specification element configured to indicate a Traffic Identifier (TID), the UPID element configured to indicate a protocol to handle Media-Access-Control (MAC) service data units (MSDUs) corresponding to the TID, the UPID element comprising a Logical-Link-Control (LLC) header field, and a no-LLC field, the LLC header field comprising values of a LLC header, and the no-LLC field configured to indicate that said MSDUs are not to include the LLC header; and
transmit the ADDTS frame over a directional frequency band comprising a channel with a channel starting frequency above 45 Giqahertz (GHz).

19. The product of claim 18, wherein said LLC header field comprises values of a LLC header with eight-bit control field without Sub-Network-Access-Protocol (SNAP), the LLC header field having a size of three octets.

20. The product of claim 18, wherein said LLC header field comprises values of a LLC header with eight-bit control field with Sub-Network-Access-Protocol (SNAP), the LLC header field having a size of eight octets.

21. The product of claim 18, wherein said LLC header field comprises values of a LLC header with sixteen-bit control field, the LLC header field having a size of four octets.

22. The product of claim 18, wherein said no-LLC field comprises a value of "1".

23. The product of claim 18, wherein said ADDTS frame comprises an ADDTS request frame.

24. The product of claim 23, wherein said instructions, when executed, cause the wireless station to process a received ADDTS response frame in response to the ADDTS request frame, the ADDTS response frame comprising a status code to indicate success or rejection of a setting of the UPID element.

25. The product of claim 18, wherein said ADDTS frame comprises an ADDTS response frame.

26. The product of claim 25, wherein said ADDTS response frame is in response to an ADDTS request frame comprising said UPID element.

27. A method to be performed by a wireless station, the method comprising:

generating an Add-Traffic-Specification (ADDTS) frame comprising a traffic specification element and an Upper-Layer-Identification (UPID) element, the traffic specification element configured to indicate a Traffic Identifier (TID), the UPID element configured to indicate a protocol to handle Media-Access-Control (MAC) service data units (MSDUs) corresponding to the TID, the UPID element comprising a Logical-Link-Control (LLC) header field, and a no-LLC field, the LLC header field comprising values of a LLC header, and the no-LLC field configured to indicate that said MSDUs are not to include the LLC header; and transmitting the ADDTS frame over a directional frequency band comprising a channel with a channel starting frequency above 45 Gigahertz (GHz).

28. The method of claim 27 comprising transmitting the MSDUs without the LLC header.

* * * * *